United States Patent
Zhu et al.

(10) Patent No.: US 10,340,497 B2
(45) Date of Patent: Jul. 2, 2019

(54) SECONDARY BATTERY

(71) Applicant: NINGDE AMPEREX TECHNOLOGY LIMITED, Ningde (CN)

(72) Inventors: Baojian Zhu, Ningde (CN); Hong Yang, Ningde (CN); Qiao Zeng, Ningde (CN); Jiacai Cai, Ningde (CN); Shoujiang Xu, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 259 days.

(21) Appl. No.: 15/400,673

(22) Filed: Jan. 6, 2017

(65) Prior Publication Data
US 2017/0207438 A1 Jul. 20, 2017

(30) Foreign Application Priority Data
Jan. 20, 2016 (CN) .................... 2016 2 0053868 U

(51) Int. Cl.
*H01M 2/26* (2006.01)
*H01M 2/30* (2006.01)
(Continued)

(52) U.S. Cl.
CPC .............. *H01M 2/263* (2013.01); *H01M 2/30* (2013.01); *H01M 4/75* (2013.01);
(Continued)

(58) Field of Classification Search
CPC .................................................. H01M 2/263
See application file for complete search history.

(56) References Cited

U.S. PATENT DOCUMENTS

| 6,180,285 B1 | 1/2001 | Yoshida |
| 2008/0102362 A1 | 5/2008 | Nii |

(Continued)

FOREIGN PATENT DOCUMENTS

| CN | 200953357 Y | 9/2007 |
| CN | 203445180 U | 2/2014 |

(Continued)

OTHER PUBLICATIONS

Ningde Amperex Technology Limited, Extended European Search Report, EP17150821.1, dated Apr. 6, 2017, 9 pgs.

*Primary Examiner* — Sarah A. Slifka
*Assistant Examiner* — Brian R Ohara
(74) *Attorney, Agent, or Firm* — Morgan, Lewis & Bockius LLP

(57) ABSTRACT

A secondary battery comprises a cell. The cell includes a positive electrode plate having a positive current collector and a negative electrode plate having a negative current collector. The secondary battery further includes: a first positive electrode tab and a second positive electrode tab, one end of the first positive electrode tab is fixed on and electrically connects with the positive current collector, the other end of the first positive electrode tab extends to the outside of the cell; and/or, a first negative electrode tab and a second negative electrode tab, one end of the first negative electrode tab is fixed on and electrically connects with the negative current collector, the other end of the first negative electrode tab extends to the outside of the cell, one end of the second negative electrode tab is fixed on and electrically connects with the other end of the first negative electrode tab.

7 Claims, 6 Drawing Sheets

(51) Int. Cl.
    *H01M 4/75*     (2006.01)
    *H01M 10/04*     (2006.01)
    *H01M 2/02*     (2006.01)
    *H01M 4/66*     (2006.01)

(52) U.S. Cl.
    CPC ...... *H01M 10/0431* (2013.01); *H01M 2/0212* (2013.01); *H01M 4/661* (2013.01); *H01M 2220/30* (2013.01)

(56) References Cited

U.S. PATENT DOCUMENTS

| | | | |
|---|---|---|---|
| 2008/0138716 A1* | 6/2008 | Iwama | H01M 4/134 429/338 |
| 2012/0009450 A1* | 1/2012 | Chun | H01M 2/023 429/94 |
| 2014/0147716 A1 | 5/2014 | Oh | |
| 2016/0133916 A1* | 5/2016 | Zagars | H01M 4/02 429/152 |
| 2016/0218386 A1* | 7/2016 | Park | H01M 10/052 |

FOREIGN PATENT DOCUMENTS

| | | |
|---|---|---|
| CN | 102104130 B | 12/2014 |
| KR | 20110034489 A | 4/2011 |

\* cited by examiner

SECONDARY BATTERY

REFERENCE TO RELATED APPLICATIONS

The present disclosure claims priority to Chinese patent application No. 201620053868.2, filed on Jan. 20, 2016, which is incorporated herein by reference in its entirety.

FIELD OF THE PRESENT DISCLOSURE

The present disclosure relates to a field of battery, and particularly relates to a secondary battery.

BACKGROUND OF THE PRESENT DISCLOSURE

With development of electronic products toward miniaturization and multi-function, the electronic products have increasingly higher requirements on energy density of a battery used thereby, which requires a cell of the battery to provide more capacity in the same space. In a secondary battery with a conventional wound type cell, both of a starting end of a positive electrode plate and a starting end of a negative electrode plate positioned at the innermost of the wound type cell each are provided with a blank current collector, the blank current collector is a part of the current collector, each surface of the part is not coated with an active material layer. One end of a positive electrode tab is directly welded to the blank current collector of the positive electrode plate and the other end of the positive electrode tab extends to the outside of a packaging bag about 10 mm. One end of the negative electrode tab is directly welded to the blank current collector of the negative electrode plate and the other end of the negative electrode tab extends to the outside of the packaging bag about 10 mm. If the electrode tab (i.e. the positive electrode tab or the negative electrode tab) is too thin, the strength of the electrode tab will be lower, the portion of the electrode tab that extends to the outside of the packaging bag will be broken easily, and an overcurrent sectional area of the electrode tab will be smaller, therefore, in order to ensure the strength and the overcurrent sectional area of the electrode tab, the thickness of the electrode tab is generally 60 μm or more. A thickness of an area where the electrode tab is welded is the maximum thickness in the wound type cell due to this superimposed thickness of the electrode tab, and because the thickness of the electrode tab is difficult to decrease further, the energy density of the cell is difficult to promote further.

In the existing battery structures, the positive electrode tab is welded to the current collector (i.e. the bank current collector) of the positive electrode plate by ultrasonic welding and the negative electrode tab is welded to the current collector (i.e. the bank current collector) of the negative electrode plate by ultrasonic welding, it needs to bond adhesive tapes above both sides of a part where the electrode tab (i.e. the positive electrode tab or the negative electrode tab) and the current collector are welded together, and the positive electrode tab and the negative electrode tab extends to the outside of the packaging bag after they are sealed by the packaging bag.

Therefore, the problem existing in the existing process is:
1. The thickness of the electrode tab is larger, so the electrode tab occupies a larger space of the cell in a thickness direction;
2. It needs to bond adhesive tapes above the both sides of the part where the electrode tab and the current collector are welded together, so the adhesive tapes also occupy a larger space of the cell in thickness direction;
3. Due to the larger thickness of the electrode tab, it has to use a bigger welding head to achieve ultrasonic welding, which leads to deeper uneven points formed on the current collector.

SUMMARY OF THE PRESENT DISCLOSURE

In view of the problem existing in the background, an object of the present disclosure is to provide a secondary battery, which can reduce a thickness of a cell of a secondary battery, improve an energy density of the cell and an overcurrent sectional area of an electrode tab.

In order to achieve the above object, the present disclosure provides a secondary battery which comprises a cell.

The cell comprises a positive electrode plate having a positive current collector and a negative electrode plate having a negative current collector.

The secondary battery according to the present disclosure further comprises: a first positive electrode tab and a second positive electrode tab, one end of the first positive electrode tab is fixed on and electrically connects with the positive current collector, the other end of the first positive electrode tab extends to the outside of the cell, one end of the second positive electrode tab is fixed on and electrically connects with the other end of the first positive electrode tab, a width of the second positive electrode tab is less than a width of the first positive electrode tab, and a thickness of the second positive electrode tab is larger than a thickness of the first positive electrode tab; and/or, a first negative electrode tab and a second negative electrode tab, one end of the first negative electrode tab is fixed on and electrically connects with the negative current collector, the other end of the first negative electrode tab extends to the outside of the cell, one end of the second negative electrode tab is fixed on and electrically connects with the other end of the first negative electrode tab, a width of the second negative electrode tab is less than a width of the first negative electrode tab, and a thickness of the second negative electrode tab is larger than a thickness of first negative electrode tab.

The present disclosure has the following beneficial effects: in the secondary battery according to the present disclosure, the thickness of the second positive electrode tab can ensure the strength of the second positive electrode tab itself, and because the thickness of the second positive electrode tab is larger than the thickness of the first positive electrode tab, a thickness of the cell finally formed will be reduced and the energy density of the cell will be promoted; and/or, the thickness of the second negative electrode tab can ensure the strength of the second negative electrode tab itself, and because the thickness of the second negative electrode tab is larger than the thickness of the first negative electrode tab, the thickness of the cell finally formed will be reduced and the energy density of the cell will be promoted. At the same time, the width of the second positive electrode tab is less than the width of the first positive electrode tab, so the overcurrent sectional area of the first positive electrode tab will be increased; and/or, the width of the second negative electrode tab is less than the width of the first negative electrode tab, so the overcurrent sectional area of the first negative electrode tab will be increased.

Figure 1:
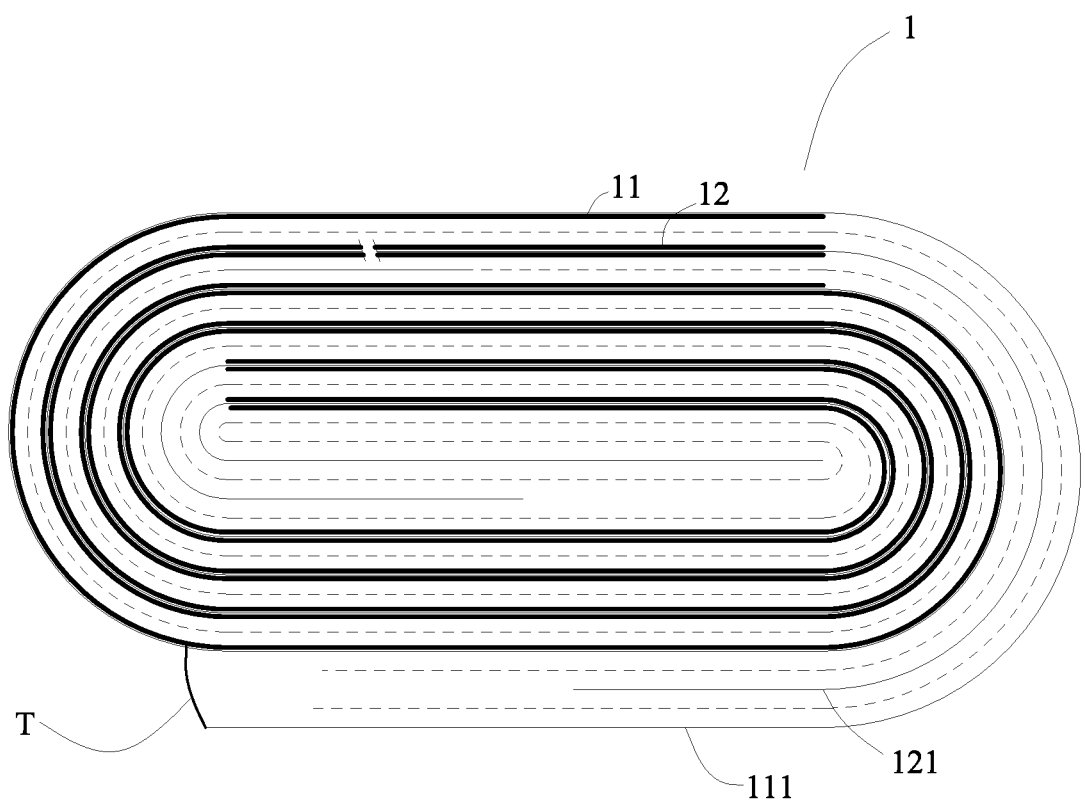
FIG. 1 is a schematic view of a cell of a secondary battery according to the present disclosure.

REFERENCE NUMERALS OF THE EMBODIMENTS ARE REPRESENTED AS FOLLOWS 1 cell
11 positive electrode plate
111 positive current collector
12 negative electrode plate
121 negative current collector
2 first positive electrode tab
3 first negative electrode tab
4 second positive electrode tab
5 second negative electrode tab
P packaging bag
S1 first surface
S2 first back surface
S3 second surface
S4 second back surface
T single-sided adhesive tape

DETAILED DESCRIPTION

Hereinafter a secondary battery according to the present disclosure will be described in detail in combination with the figures.

Referring to FIGS. 1-8, a secondary battery according to the present disclosure comprises a cell 1.

The cell 1 comprises a positive electrode plate 11 having a positive current collector 111 and a negative electrode plate 12 having a negative current collector 121.

The secondary battery according to the present disclosure further comprises: a first positive electrode tab 2 and a second positive electrode tab 4, one end of the first positive electrode tab 2 is fixed on and electrically connects with the positive current collector 111, the other end of the first positive electrode tab 2 extends to the outside of the cell 1, one end of the second positive electrode tab 4 is fixed on and electrically connects with the other end of the first positive electrode tab 2, a width of the second positive electrode tab 4 is less than a width of the first positive electrode tab 2, and a thickness of the second positive electrode tab 4 is larger than a thickness of the first positive electrode tab 2; and/or, a first negative electrode tab 3 and a second negative electrode tab 5, one end of the first negative electrode tab 3 is fixed on and electrically connects with the negative current collector 121, the other end of the first negative electrode tab 3 extends to the outside of the cell 1, one end of the second negative electrode tab 5 is fixed on and electrically connects with the other end of the first negative electrode tab 3, a width of the second negative electrode tab 5 is less than a width of the first negative electrode tab 3, and a thickness of the second negative electrode tab 5 is larger than a thickness of first negative electrode tab 3. It is noted that the first positive electrode tab 2 may extend to the outside of the cell 1 by means of bending, and the first negative electrode tab 3 may extend to the outside of the cell 1 by means of bending.

In the secondary battery according to the present disclosure, the thickness of the second positive electrode tab 4 can ensure the strength of the second positive electrode tab 4 itself, and because the thickness of the second positive electrode tab 4 is larger than the thickness of the first positive electrode tab 2, a thickness of the cell 1 finally formed will be reduced and the energy density of the cell 1 will be promoted; and/or, the thickness of the second negative electrode tab 5 can ensure the strength of the second negative electrode tab 5 itself, and because the thickness of the second negative electrode tab 5 is larger than the thickness of the first negative electrode tab 3, the thickness of the cell 1 finally formed will be reduced and the energy density of the cell 1 will be promoted. At the same time, the width of the second positive electrode tab 4 is less than the width of the first positive electrode tab 2, so the overcurrent sectional area of the first positive electrode tab 2 will be increased; and/or, the width of the second negative electrode tab 5 is less than the width of the first negative electrode tab 3, so the overcurrent sectional area of the first negative electrode tab 3 will be increased.

In an embodiment of the secondary battery according to the present disclosure, the first positive electrode tab 2 may be an aluminum foil.

In an embodiment of the secondary battery according to the present disclosure, the first negative electrode tab 3 may be a copper foil.

In an embodiment of the secondary battery according to the present disclosure, the second positive electrode tab 4 may be made of aluminum.

In an embodiment of the secondary battery according to the present disclosure, the second negative electrode tab 5 may be made of nickel.

In an embodiment of the secondary battery according to the present disclosure, the thickness of the first positive electrode tab 2 may be between 20 μm and 50 μm, the width of the first positive electrode tab 2 may be between 6 mm and 30 mm.

In an embodiment of the secondary battery according to the present disclosure, the thickness of the first negative electrode tab 3 may be between 20 μm and 50 μm, the width of the first negative electrode tab 3 may be between 6 mm and 30 mm.

In an embodiment of the secondary battery according to the present disclosure, the thickness of the second positive electrode tab 4 may be between 50 μm and 150 μm, the width of the second positive electrode tab 4 may be between 3 mm and 15 mm.

In an embodiment of the secondary battery according to the present disclosure, the thickness of the second negative electrode tab 5 may be between 50 μm and 150 μm, the width of the second negative electrode tab 5 may be between 3 mm and 15 mm.

In an embodiment of the secondary battery according to the present disclosure, an adhesive tape is bonded above a part where the first positive electrode tab 2 and the positive current collector 111 are fixed and connected together.

In an embodiment of the secondary battery according to the present disclosure, an adhesive tape is bonded above a part where the first negative electrode tab 3 and the negative current collector 121 are fixed and connected together.

Figure 4:
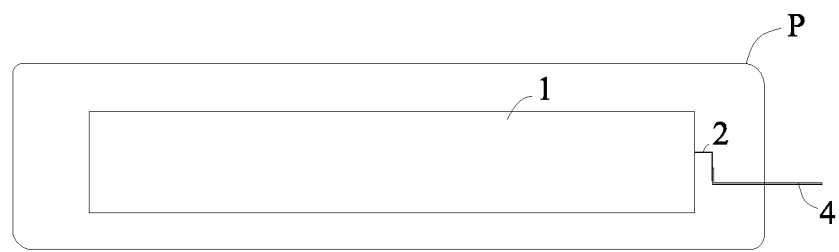
FIG. 4 is a packaging schematic view of the secondary battery according to the present disclosure.

In an embodiment of the secondary battery according to the present disclosure, referring to FIG. 4, an end of the second positive electrode tab 4 which does not connect with the first positive electrode tab 2 extends to the outside of a packaging bag P of the secondary battery.

In an embodiment of the secondary battery according to the present disclosure, a portion of the second positive electrode tab 4 which is sealed by the packaging bag P is bonded with an adhesive tape (not shown) around a whole periphery of the portion.

In an embodiment of the secondary battery according to the present disclosure, an end of the second negative electrode tab 5 which does not connect with the first negative electrode tab 3 extends to the outside of the packaging bag P of the secondary battery.

In an embodiment of the secondary battery according to the present disclosure, a portion of the second negative electrode tab 5 which is sealed by the packaging bag P is bonded with an adhesive tape (not shown) around a periphery of the portion.

In an embodiment of the secondary battery according to the present disclosure, the adhesive tape may be an adhesive tape with a green color.

In an embodiment of the secondary battery according to the present disclosure, a thickness of the adhesive tape may be between 10 μm and 35 μm.

In an embodiment of the secondary battery according to the present disclosure, the first positive electrode tab 2 is fixed on the positive current collector 111 by ultrasonic welding; and/or, the first negative electrode tab 3 is fixed on the negative current collector 121 by ultrasonic welding.

Figure 5:
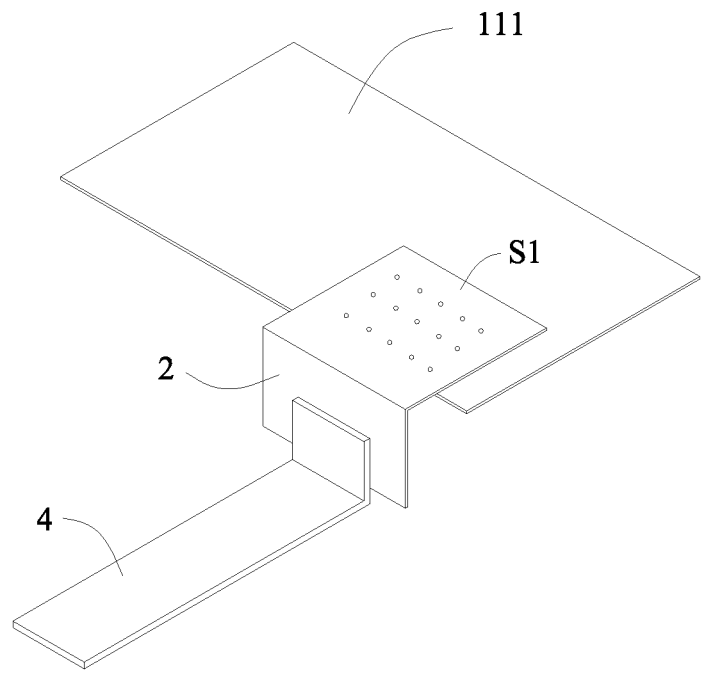
FIG. 5 is a schematic view illustrating a connection relationship between a first positive electrode tab and a positive current collector of the secondary battery according to the present disclosure.
Figure 6:
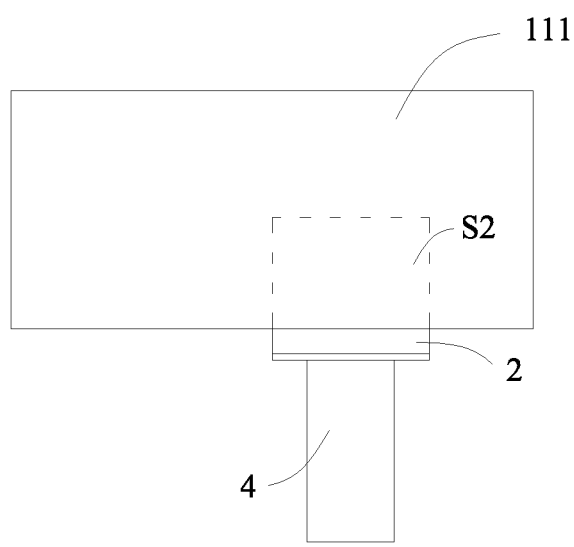
FIG. 6 is a bottom view of FIG. 5.

In an embodiment of the secondary battery according to the present disclosure, referring to FIG. 5 and FIG. 6, uneven points are formed on a first surface S1 of the first positive electrode tab 2 at a part where the first positive electrode tab 2 and the positive current collector 111 are fixed together by the ultrasonic welding, an adhesive tape (not shown) is bonded on the uneven points (as indicated in form of small circles in FIG. 5) formed on the first surface S1, and a roughness of a first back surface S2 of the positive current collector 111 which is opposite to the first surface S1 is between 1.5 μm and 10 μm. Specifically, the first positive electrode tab 2 is fixed on the positive current collector 111 by ultrasonic welding, and an ultrasonic welding device has a welding head with dense protrusions which corresponds to the first surface S1 of the first positive electrode tab 2, and a flat welding anvil which corresponds to the first back surface S2 of the positive current collector 111, so when the ultrasonic welding is finished, it doesn't need to bond an adhesive tape on the first back surface S2 because a roughness of the first back surface S2 is lower, but it needs to bond an adhesive tape on the first surface S1 because the roughness of the first surface S1 is higher. Because there is no need to bond an adhesive tape on the first back surface S2, the thickness of the cell 1 finally formed will be reduced further, and the energy density of the cell 1 will be promoted. It is noted that, when ultrasonic welding is performed, the protrusions press against on the first surface S1, the first positive electrode tab 2 and the positive current collector 111 are melted and jointed together at their facing surfaces within a range corresponding to a periphery range of the protrusions of the welding head, at the same time the first surface S1 of the first positive electrode tab 2 is deformed to form the uneven points on the first surface S1 of the first positive electrode tab 2.

Figure 7:
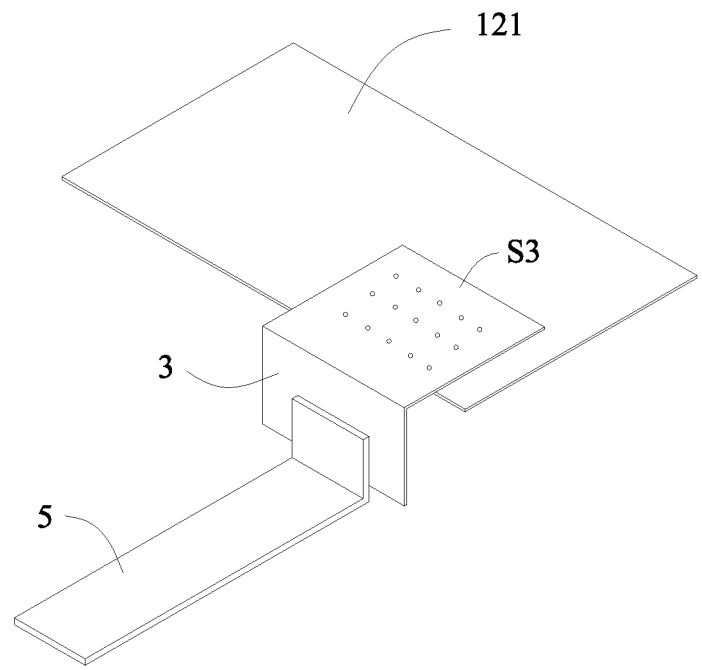
FIG. 7 is a schematic view illustrating a connection relationship between a first negative electrode tab and a negative current collector of the secondary battery according to the present disclosure.
Figure 8:
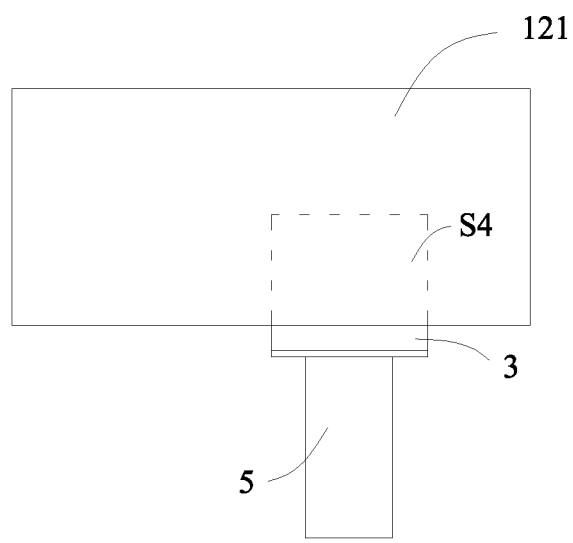
FIG. 8 is a bottom view of FIG. 7.

In an embodiment of the secondary battery according to the present disclosure, referring to FIG. 7 and FIG. 8, uneven points are formed on a second surface S3 of the first negative electrode tab 3 at a part where the first negative electrode tab 3 and the negative current collector 121 are fixed together by the ultrasonic welding, an adhesive tape (not shown) is bonded on the uneven points (as indicated in form of small circles in FIG. 7) formed on the second surface S3, and a roughness of a second back surface S4 of the negative current collector 121 opposite to the second surface S3 is between 1.5 μm and 10 μm. Specifically, the first negative electrode tab 3 is fixed on the negative current collector 121 by ultrasonic welding, and the ultrasonic welding device has a welding head with dense protrusions which corresponds to the second surface S3 of the first negative electrode tab 3, and a flat welding anvil which corresponds to the second back surface S4 of the negative current collector 121, so when the ultrasonic welding is finished, it doesn't need to bond an adhesive tape on the second back surface S4 because the roughness of the second back surface S4 is lower, but it needs to bond an adhesive tape on the second surface S3 because the roughness of the second surface S3 is higher. Because there is no need to bond an adhesive tape on the second back surface S4, the thickness of the cell 1 finally formed will be reduced further, and the energy density of the cell 1 will be promoted. It is noted that, when ultrasonic welding is performed, the protrusions press against on the second surface S3, the first negative electrode tab 3 and the negative current collector 121 are melted and jointed together at their facing surfaces within a range corresponding to a periphery range of the protrusions of the welding head, at the same time the second surface S3 of the first negative electrode tab 3 is deformed to form the uneven points on the second surface S3 of the first negative electrode tab 3.

In an embodiment of the secondary battery according to the present disclosure, the second positive electrode tab 4 is fixed on the first positive electrode tab 2 by welding; and/or, the second negative electrode tab 5 is fixed on the first negative electrode tab 3 by welding.

Figure 2:
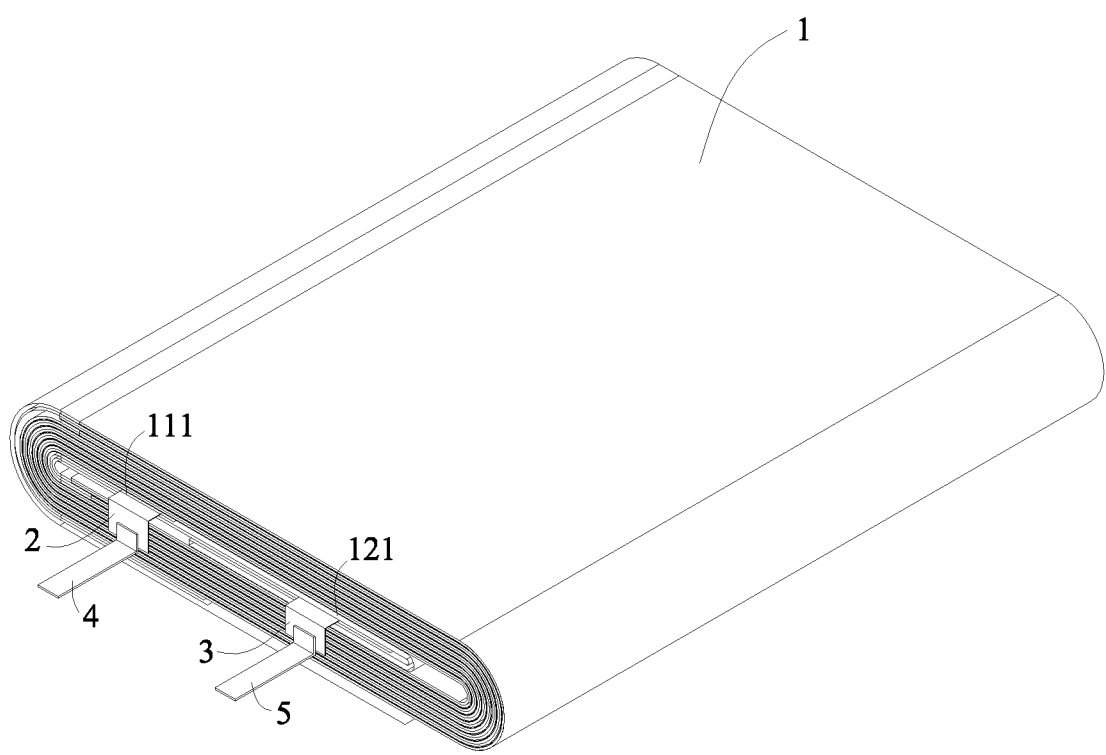
FIG. 2 is a perspective view of an embodiment of the secondary battery according to the present disclosure.

In an embodiment of the secondary battery according to the present disclosure, referring to FIG. 2, the one end of the first positive electrode tab 2 is fixed on and electrically connects with the positive current collector 111 at a starting end of the positive electrode plate 11 positioned at the innermost of the cell 1 which is a wound type cell; and/or, the one end of the first negative electrode tab 3 is fixed on and electrically connects with the negative current collector 121 at a starting end of the negative electrode plate 12 positioned at the innermost of the cell 1 which is the wound type cell. The first positive electrode tab 2 is provided to the positive current collector 111 at the starting end of the positive electrode plate 11, and/or, the first negative electrode tab 3 is provided to the negative current collector 121 at the starting end of the negative electrode plate 12, which will improve the symmetry of the cell 1 and reduce a swelling thickness of the cell 1 during charging and discharging.

Figure 3:
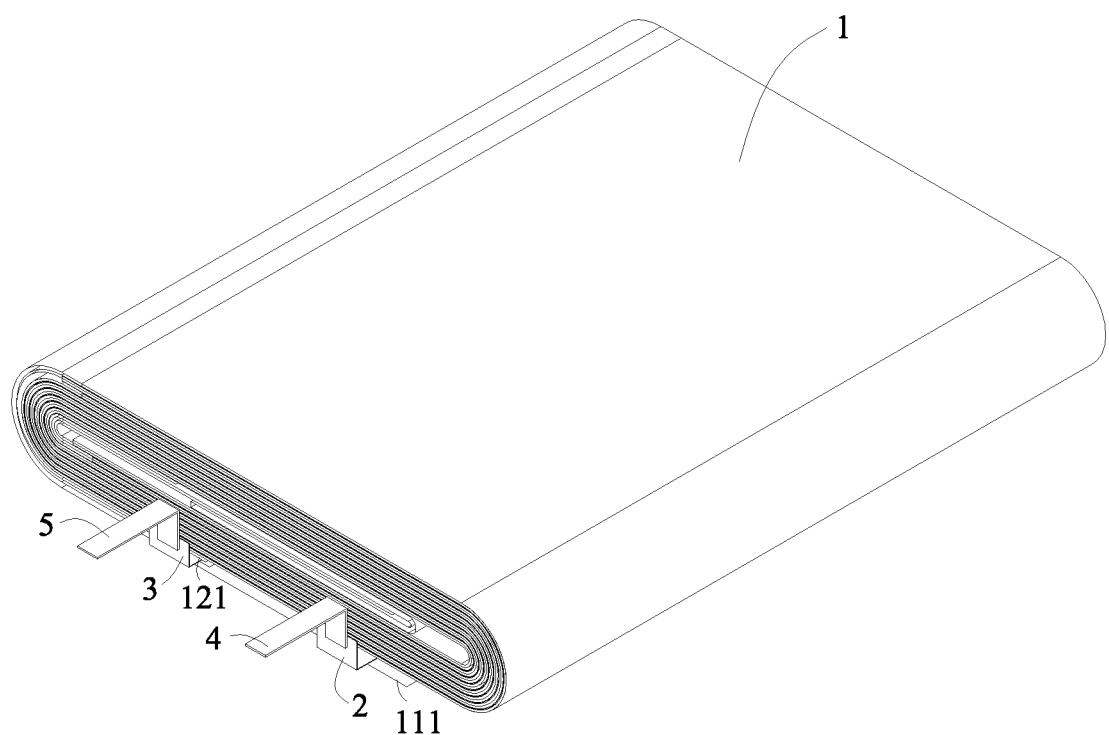
FIG. 3 is a perspective view of another embodiment of the secondary battery according to the present disclosure.

In an embodiment of the secondary battery according to the present disclosure, referring to FIG. 3, the one end of the first positive electrode tab 2 is fixed on and electrically connects with the positive current collector 111 at a tail end of the positive electrode plate 11 positioned at the outermost of the cell 1 which is the wound type cell; and/or, the one end of the first negative electrode tab 3 is fixed on and electrically connects with the negative current collector 12 at a tail end of the negative electrode plate 12 positioned at the outermost of the cell 1 which is the wound type cell.

In the secondary battery according to the present disclosure, the cell 1 may be a laminated type cell, a wound type cell or a laminated-wound composite type cell.

In the secondary battery according to the present disclosure, the secondary battery may be a lithium-ion secondary battery, a zinc-ion secondary battery or a sodium-ion secondary battery.

In the secondary battery according to the present disclosure, referring to FIG. 1, the cell 1 is a wound cell; the secondary battery may further comprise: a single-sided adhesive tape T bonded on a wound ending of the cell 1, so as to avoid the wound cell 1 loosening.

What is claimed is:

1. A secondary battery, comprising:
   a cell, comprising:
   a positive electrode plate having a positive current collector; and
   a negative electrode plate having a negative current collector;
   wherein
   the secondary battery further comprises:
   a first positive electrode tab and a second positive electrode tab, one end of the first positive electrode tab is fixed on and electrically connects with the positive current collector, the other end of the first positive electrode tab extends to the outside of the cell, one end of the second positive electrode tab is fixed on and electrically connects with the other end of the first positive electrode tab, a width of the second positive electrode tab is less than a width of the first positive electrode tab, and a thickness of the second positive electrode tab is larger than a thickness of the first positive electrode tab, the first positive electrode tab is fixed on the positive current collector by ultrasonic welding, uneven points are formed on a first surface of the first positive electrode tab at a part where the first positive electrode tab and the positive current collector are fixed together by the ultrasonic welding, an adhesive tape is bonded on the uneven points formed on the first surface, and a roughness of a first back surface which is opposite to the first surface of the positive current collector is between 1.5 μm and 10 μm; and/or
   a first negative electrode tab and a second negative electrode tab, one end of the first negative electrode tab is fixed on and electrically connects with the negative current collector, the other end of the first negative electrode tab extends to the outside the cell, one end of the second negative electrode tab is fixed on and electrically connects with the other end of the first negative electrode tab, a width of the second negative electrode tab is less than a width of the first negative electrode tab, and a thickness of the second negative electrode tab is larger than a thickness of first negative electrode tab, the first negative electrode tab is fixed on the negative current collector by ultrasonic welding, uneven points are formed on a second surface of the first negative electrode tab at a part where the first negative electrode tab and the negative current collector are fixed together by the ultrasonic welding, an adhesive tape is bonded on the uneven points formed on the second surface, and a roughness of a second back surface which is opposite to the second surface of the negative current collector is between 1.5 μm and 10 μm.

2. The secondary battery according to claim 1, wherein the thickness of the first positive electrode tab is between 20 μm and 50 μm, and the width of the first positive electrode tab is between 6 mm and 30 mm.

3. The secondary battery according to claim 1, wherein the thickness of the first negative electrode tab is between 20 μm and 50 μm, and the width of the first negative electrode tab is between 6 mm and 30 mm.

4. The secondary battery according to claim 1, wherein the thickness of the second positive electrode tab is between 50 μm and 150 μm, and the width of the second positive electrode tab is between 3 mm and 15 mm.

5. The secondary battery according to claim 1, wherein the thickness of the second negative electrode tab is between 50 μm and 150 μm, and the width of the second negative electrode tab is between 3 mm and 15 mm.

6. The secondary battery according to claim 1, wherein
   the one end of the first positive electrode tab is fixed on and electrically connects with the positive current collector at a starting end of the positive electrode plate positioned at the innermost of the cell which is a wound type cell; and/or
   the one end of the first negative electrode tab is fixed on and electrically connects with the negative current collector at a starting end of the negative electrode plate positioned at the innermost of the cell which is the wound type cell.

7. The secondary battery according to claim 1, wherein
   the one end of the first positive electrode tab is fixed on and electrically connects with the positive current collector at a tail end of the positive electrode plate positioned at the outermost of the cell which is a wound type cell; and/or
   the one end of the first negative electrode tab is fixed on and electrically connects with the negative current collector at a tail end of the negative electrode plate positioned at the outermost of the cell which is the wound type cell.

\* \* \* \* \*